(12) United States Patent
Yuan et al.

(10) Patent No.: US 12,548,262 B2
(45) Date of Patent: Feb. 10, 2026

(54) VIDEO PATROL METHOD AND DEVICE, ELECTRONIC DEVICE, AND READABLE MEDIUM

(71) Applicant: CRSC COMMUNICATION & INFORMATION GROUP COMPANY LTD., Beijing (CN)

(72) Inventors: Zhenjiang Yuan, Beijing (CN); Haijun Hu, Beijing (CN); Ping Feng, Beijing (CN); Feng Liu, Beijing (CN); Tianjiao Yang, Beijing (CN); Yanzhen Bi, Beijing (CN)

(73) Assignee: CRSC COMMUNICATION & INFORMATION GROUP COMPANY LTD., Beijing (CN)

( * ) Notice: Subject to any disclaimer, the term of this patent is extended or adjusted under 35 U.S.C. 154(b) by 390 days.

(21) Appl. No.: 18/030,806

(22) PCT Filed: Sep. 30, 2021

(86) PCT No.: PCT/CN2021/122239
§ 371 (c)(1),
(2) Date: May 5, 2023

(87) PCT Pub. No.: WO2022/095651
PCT Pub. Date: May 12, 2022

(65) Prior Publication Data
US 2023/0377277 A1    Nov. 23, 2023

(30) Foreign Application Priority Data
Nov. 5, 2020 (CN) .......................... 202011222345.3

(51) Int. Cl.
*G06T 19/00* (2011.01)
*G05D 1/00* (2006.01)
(Continued)

(52) U.S. Cl.
CPC .......... *G06T 19/003* (2013.01); *G05D 1/0229* (2013.01); *G06T 19/006* (2013.01); *H04N 7/183* (2013.01); *G08B 21/18* (2013.01)

(58) Field of Classification Search
CPC ... G06T 19/003; G06T 19/006; G05D 1/0229; H04N 7/183; G08B 21/18
(Continued)

(56) References Cited

U.S. PATENT DOCUMENTS

| | | |
|---|---|---|
| 2016/0225179 A1 | 8/2016 | Sheppard et al. |
| 2016/0344982 A1* | 11/2016 | Hanai ..................... G06T 11/60 |
| 2017/0323482 A1* | 11/2017 | Coup ................... H04N 13/383 |

FOREIGN PATENT DOCUMENTS

| | | | | |
|---|---|---|---|---|
| CN | 104599243 | * | 5/2015 | ............... G06T 5/00 |
| CN | 104809758 A | | 7/2015 | |

(Continued)

OTHER PUBLICATIONS

WIPO, International Search Report issued on Dec. 2, 2021.
CN202011222345.3 First Office Action issued on Sep. 2, 2022.

*Primary Examiner* — Jin Ge
(74) *Attorney, Agent, or Firm* — Li & Cai Intellectual Property (USA) Office

(57) ABSTRACT

The present disclosure relates to the technical field of video monitor information. Provided are a video patrol method and apparatus, an electronic device, and a readable medium. The video patrol method comprises: obtaining video patrol information, wherein the video patrol information is video information obtained from a real scene; matching and combining the video patrol information with a 3D roaming scenario to obtain a 3D patrol video, wherein the 3D roaming scenario is a virtual scenario obtained by simulating the real scene; and displaying the 3D patrol video. The
(Continued)

present disclosure can reduce the labor intensity of operation and maintenance workers, and improve the patrol efficiency.

12 Claims, 4 Drawing Sheets

(51) Int. Cl.
*H04N 7/18* (2006.01)
*G08B 21/18* (2006.01)

(58) Field of Classification Search
USPC .......................................................... 345/419
See application file for complete search history.

(56) References Cited

FOREIGN PATENT DOCUMENTS

| | | | | |
|---|---|---|---|---|
| CN | 106647586 A | 5/2017 | | |
| CN | 108388194 A | 8/2018 | | |
| CN | 109066416 A | 12/2018 | | |
| CN | 110290350 A | 9/2019 | | |
| CN | 110400387 A | 11/2019 | | |
| CN | 110417120 | * 11/2019 | .............. | H02J 13/00 |
| CN | 110417120 A | 11/2019 | | |
| CN | 110722559 A | 1/2020 | | |
| CN | 110796727 A | 2/2020 | | |
| CN | 111476921 A | 7/2020 | | |
| CN | 111798572 A | 10/2020 | | |
| CN | 112399145 A | 2/2021 | | |
| WO | WO 2020107957 A1 | 6/2020 | | |
| WO | WO2022/061673 | * 9/2020 | .............. | G06T 7/80 |

* cited by examiner

VIDEO PATROL METHOD AND DEVICE, ELECTRONIC DEVICE, AND READABLE MEDIUM

TECHNICAL FIELD

The present disclosure relates to the field of video monitoring information technology, and in particular, to a video patrol method and device, an electronic device, and a readable medium.

BACKGROUND

With the improvement of informatization and intellectualization of road traffic, more and more devices are disposed in a machine room, which brings growing pressure to operation and maintenance work. However, the current operation and maintenance work is mainly performed by means of manual patrol, which has not only low patrol efficiency but also high cost, and which cannot meet the requirements of the informatization and intellectualization of the road traffic.

SUMMARY

The present disclosure provides a video patrol method and device, an electronic device, and a readable medium.

In the first aspect of the present disclosure, there is provided a video patrol method, including:
  acquiring video patrol information, wherein the video patrol information is video information acquired from a real scene;
  matching and combining the video patrol information with a 3D roaming scene to obtain a 3D patrol video, wherein the 3D roaming scene is a virtual scene obtained by simulating the real scene; and
  displaying the 3D patrol video.

In the second aspect of the present disclosure, there is provided a video patrol device, including:
  an acquisition module configured to acquire video patrol information, wherein the video patrol information is video information acquired from a real scene in a patrolled area;
  a matching and combination module configured to match and combine the video patrol information with a 3D roaming scene to obtain a 3D patrol video, wherein the 3D roaming scene is a virtual scene obtained by simulating the real scene; and
  a display module configured to display the 3D patrol video.

In the third aspect of the present disclosure, an electronic device is provided and includes:
  at least one processor; and
  a memory in communication with the at least one processor; wherein
  the memory stores an instruction executable by the at least one processor, and the instruction, when executed by the at least one processor, causes the at least one processor to carry out the video patrol method according to the first aspect.

In the fourth aspect of the present disclosure, provided is a non-transitory computer-readable storage medium storing a computer instruction, which is configured to cause a computer to carry out the video patrol method according to the first aspect.

According to the video patrol method of the present disclosure, the video patrol information acquired from the real scene is matched and combined with the 3D roaming scene to obtain the 3D patrol video that simulates a real environment, and the operation and maintenance personnel can acquire operating states of patrolled objects from the 3D patrol video with no need to be present on site, so that labor intensity of the operation and maintenance personnel can be reduced; moreover, compared with on-site patrol, the patrol through the 3D patrol video can allow the operation and maintenance personnel to monitor more patrolled objects, so that patrol efficiency can be increased.

It should be understood that the SUMMARY is not intended to identify key or critical features of embodiments of the present disclosure, and is not intended to limit the scope of the present disclosure either. Other features of the present disclosure will become apparent from the following description.

BRIEF DESCRIPTION OF DRAWINGS

The accompanying drawings are intended to provide a further understanding of the present disclosure and constitute a part of the specification. In conjunction with the embodiments of the present disclosure, the drawings are used to explain the present disclosure, but do not constitute any limitation to the present disclosure. The above and other features and advantages will become more apparent to those skilled in the art from the description of specific exemplary embodiments with reference to the drawings.

IN THE DRAWINGS

Figure 1:
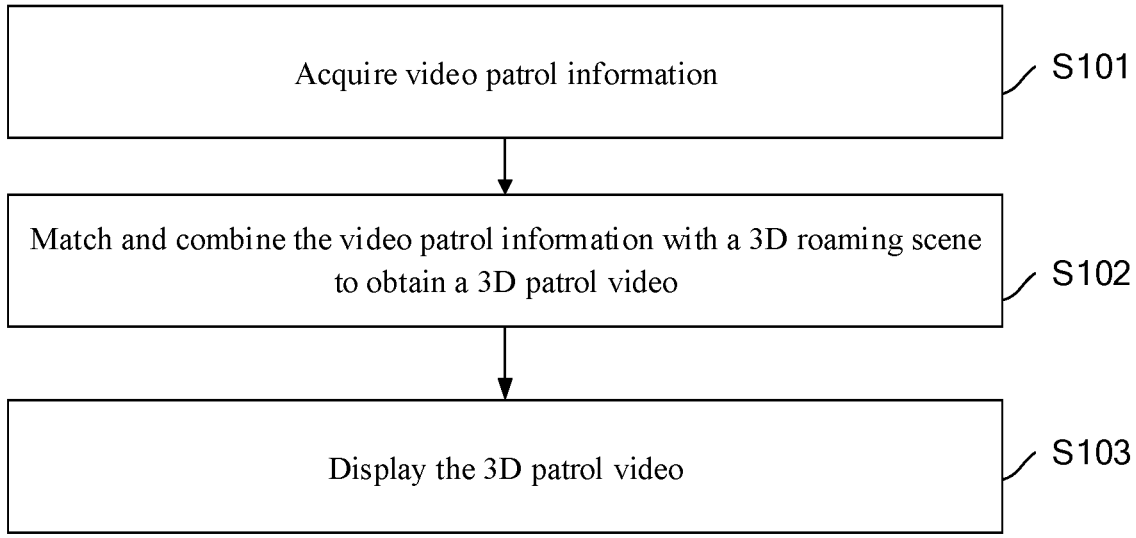
FIG. 1 is a flowchart illustrating a video patrol method according to an embodiment of the present disclosure.

400—video patrol device; 401—acquisition module; 402—matching and combination module; 403—display module; 500—acquisition module; 501—camera; 502—robot; 503—actual patrol rail; 504—control module; 600—video patrol device; 601—acquisition module; 602—matching and combination module; 603—control module; 604—storage module; 605—switch; 606—router; 700—device; 701—computing unit; 702—Read-Only Memory (ROM); 703—Random Access Memory (RAM); 704—bus; 705—I/O interface; 706—input unit; 707—output unit; 708—storage unit; 709—communication unit.

DETAIL DESCRIPTION OF EMBODIMENTS

In order to enable those skilled in the art to better understand the technical solutions of the present disclosure, exemplary embodiments of the present disclosure are described below with reference to the drawings, and various details of the embodiments of the present disclosure are described for facilitating the understanding, and should be regarded as being merely exemplary. Accordingly, those of ordinary skill in the art should be aware that various changes and modifications may be made to the embodiments described herein without departing from the scope and spirit of the present disclosure. Moreover, descriptions of well-known functions and structures are omitted from the following description for clarity and conciseness.

All the embodiments of the present disclosure and features therein can be combined with each other if no conflict is incurred.

As used herein, the term "and/or" includes one associated listed item, or any or all combinations of more than one associated listed items.

The terms used herein are only used to describe particular embodiments, and are not intended to limit the present disclosure. As used herein, "a" and "the" indicating a singular form is also intended to indicate a plural form. Unless expressly stated otherwise, it should be further understood that the term "comprise" and/or "made of . . . " used herein indicate(s) the presence of features, integers, steps, operations, elements and/or components, but does not exclude the presence or addition of one or more other features, integers, steps, operations, elements, components and/or combinations thereof. The terms "connect", "couple" and the like are not restricted to physical or mechanical connection, but may also indicate electrical connection, whether direct or indirect.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related art and the present disclosure, and should not be interpreted in an idealized or overly formal sense unless expressly so defined herein.

In the industries with higher informatization degree and higher intellectualization degree, such as the industries of railways and highways, a large number of information processing devices are disposed in a machine room. In order to ensure that those devices can stably operate, a large amount of daily operation and maintenance work is needed, and video patrol can reduce workloads of operation and maintenance personnel and can also increase operation and maintenance efficiency.

In the first aspect, an embodiment of the present disclosure provides a video patrol method. With the method, a real scene of a patrolled area (such as a machine room) is simulated using a 3D roaming technology, so as to realize automatic patrol of the patrolled area.

FIG. 1 is a flowchart illustrating the video patrol method according to the embodiment of the present disclosure. As shown in FIG. 1, the video patrol method includes the following steps S101 to S103.

In step S101, video patrol information is acquired.

The video patrol information is video information acquired from a real scene, and the real scene is a real scene in a patrolled area. For example, the patrolled area is a machine room, and the video patrol information is video information acquired from the machine room.

In some embodiments, the video patrol information is a video obtained by a camera or another device having a shooting function. For example, the video patrol information is a video obtained by using the camera to shoot each electronic and electrical appliance in the machine room.

In some embodiments, the camera may acquire the video patrol information according to a pre-planned path in the patrolled area. The planned path may be planned in advance by a user or a designer, and may allow the camera to shoot all the electronic and electric appliances in the patrolled area for no-dead-angle patrol of operating states of the electronic and electric appliances.

In step S102, the video patrol information is matched and combined with a 3D roaming scene to obtain a 3D patrol video.

The 3D roaming scene is a virtual scene obtained by simulating the real scene. A 3D model of the patrolled area is constructed using a 3D technology. In the case where the patrolled area is the machine room, a 3D virtual scene with the same scale as the machine room is constructed according to an actual length x, an actual width y, and an actual height z of the machine room, and virtual devices are added at corresponding positions in the 3D virtual scene according to the electronic and electrical appliances disposed in the machine room, thus obtaining the 3D roaming scene. The electronic and electric appliances are patrolled objects, and operating states of the patrolled objects are main objectives of the patrol.

In some embodiments, the video patrol information is matched and combined with the 3D roaming scene, so as to make the video patrol information acquired from the real scene be consistent with the positions in the 3D roaming scene, thereby synchronizing the shooting of the camera with the 3D roaming.

In step S103, the 3D patrol video is displayed.

In some embodiments, the combined 3D patrol video is displayed by a VR device such as VR glasses or a VR helmet. Or, the 3D patrol video is displayed with a common display screen and watched with 3D glasses.

According to the video patrol method according to the embodiments of the present disclosure, the video patrol information acquired from the real scene is matched and combined with the 3D roaming scene to obtain the 3D patrol video that simulates a real environment, and the operation and maintenance personnel can acquire the operating states of the patrolled objects from the 3D patrol video with no need to be present on site, so that labor intensity of the operation and maintenance personnel can be reduced; moreover, compared with on-site patrol, the patrol through the 3D patrol video can allow the operation and maintenance personnel to monitor more patrolled objects, so that patrol efficiency can be increased.

In some embodiments, the video patrol information is acquired by the camera moving in the real scene, the camera is arranged on a robot, and the robot carries the camera to move in the real scene. For example, the robot is capable of carrying the camera to move on a plane where the ground is located, and is also capable of carrying the camera to move in a vertical direction perpendicular to the ground and rotating by 360 degrees, so as to enable the camera to realize the no-dead-angle patrol.

When the robot moves on an actual patrol track, a patrol instruction may be sent to the robot through an operation module in a monitoring system, and the patrol instruction may be a patrol instruction for movement in the plane where the ground is located, such as a start instruction, a forward instruction, a backward instruction, a stop instruction, and a return to origin instruction, and may also be an ascending instruction, a descending instruction, a rotating instruction, and the like. The robot performs a corresponding action according to the patrol instruction.

In some embodiments, an actual patrol rail is provided in the patrolled area, and the robot moves along the actual patrol rail. The actual patrol rail is a guide rail which is arranged in the patrolled area in advance, and plans a patrol route of the robot, and the robot may realize the no-dead-angle patrol of the patrolled objects just by moving along the actual patrol rail together with moving in the vertical direction and rotating.

In order to realize synchronization of the video patrol information acquired by the camera with the 3D roaming scene, the camera and the 3D roaming scene need to be subjected to synchronization calibration before the patrol is actually performed, so as to synchronize the 3D roaming scene with the real scene shot by the camera, thereby improving video patrol accuracy. Since the camera is carried by the robot to move, the camera can be synchronized with the 3D roaming scene as long as the 3D roaming scene is synchronized with the robot.

Figure 2:
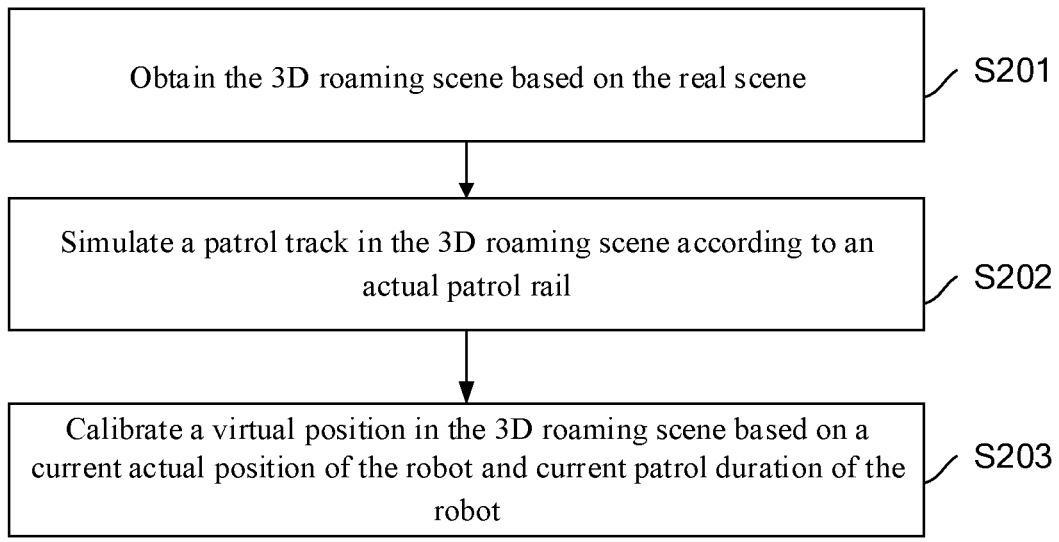
FIG. 2 is a flowchart of synchronization calibration of a 3D roaming scene and a real scene according to an embodiment of the present disclosure.

FIG. 2 is a flowchart of synchronization calibration of the 3D roaming scene and the real scene according to an embodiment of the present disclosure. As shown in FIG. 2, before matching and combining the video patrol information with the 3D roaming scene to obtain the 3D patrol video, the method further includes the following steps S201 to S203.

In step S201, the 3D roaming scene is obtained based on the real scene.

In the step S201, the real scene is simulated by the 3D technology to obtain the 3D roaming scene.

In some embodiments, the 3D roaming scene is obtained by simulating the real scene with the same scale. That is, the 3D roaming scene is obtained by simulation in equal proportion according to a length-width ratio of the patrolled area in the real scene.

It should be noted that a simulation process and a simulation mode may adopt the existing technology, which is not limited herein.

In step S202, a patrol track is simulated in the 3D roaming scene according to the actual patrol rail.

In some embodiments, the patrol track is simulated in the 3D roaming scene according to a length and a position of the actual patrol rail set in the patrolled area, that is, the patrol track is a virtual patrol track of the actual patrol rail in the 3D roaming scene.

In step S203, a virtual position in the 3D roaming scene is calibrated based on a current actual position of the robot and current patrol duration of the robot.

The current patrol duration is the time consumed by the robot to reach the current actual position from an initial position of the actual patrol track.

In some embodiments, when the robot moves on the actual patrol track, current patrol duration of the robot and a corresponding current actual position of the robot are continuously acquired at a preset time interval, and a patrol position in the 3D roaming scene is calibrated based on the current patrol duration and the corresponding current actual position.

For example, the preset time interval is 1 second, that is, when the robot moves on the actual patrol track, the current actual position is reported every 1 second, and the current patrol duration is recorded every 1 second.

In some embodiments, a patrol speed of the robot may be set by a built-in setting unit. A roaming speed in the 3D roaming scene is determined based on a roaming track length and a roaming patrol period. In some embodiments, the roaming track length and the roaming patrol period are acquired through multiple simulations and the patrol together with the robot.

In some embodiments, the patrol position in the 3D roaming scene is determined according to the current patrol duration, the patrol period and the length of the patrol track, and the patrol speed is determined according to the length of the patrol trac and the patrol period.

In some embodiments, the time consumed by the robot from the initial position of the actual patrol track to an end position of the actual patrol track is determined as one patrol period, total patrol duration of a plurality of patrol periods is obtained, average patrol duration is calculated according to some total patrol duration, and the average patrol duration is determined as the total patrol duration.

The total patrol duration may be determined in the following way: when a position of the robot begins to change (the robot begins to move), recording a starting moment; and when the position of the robot does not change any more, recording an end moment, and calculating a difference between the starting moment and the end moment, with the difference being the total patrol duration.

It should be noted that the calibration of the position in the 3D roaming scene can also be performed by other means, such as using a position scale parameter.

Figure 3:
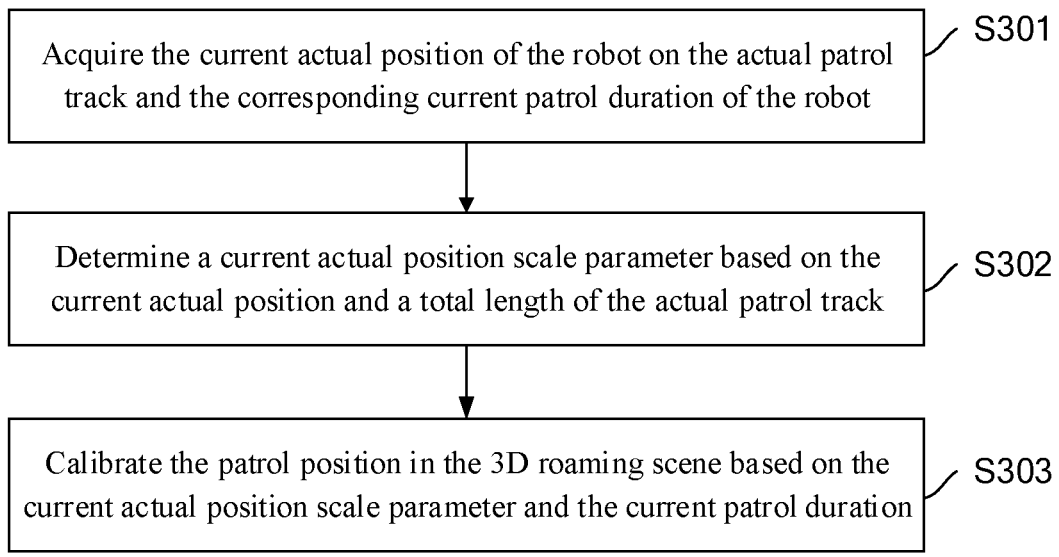
FIG. 3 is a flowchart of calibration of a position in a 3D roaming scene according to an embodiment of the present disclosure.

FIG. 3 is a flowchart of the calibration of the position in the 3D roaming scene according to an embodiment of the present disclosure.

As shown in FIG. 3, calibrating the patrol location in the 3D roaming scene based on the current actual location of the robot in the real scene and the current patrol duration of the robot includes the following steps S301 to S303.

In step S301, the current actual position of the robot on the actual patrol track and the corresponding current patrol duration are acquired.

The current actual position refers to a position of the robot with a starting point of the actual patrol track as a benchmark. The current patrol duration refers to the time taken by the robot from the starting point of the actual patrol track to the current actual position.

In some embodiments, the robot moves on the actual patrol track at a certain speed; and theoretically, the current actual position of the robot may be determined according to the current patrol duration. However, the current actual position of the robot is not completely corresponding to the current patrol duration due to hardware errors or for other reasons in practical applications, which makes it necessary to calibrate the patrol position in the 3D roaming scene.

In step S302, a current actual position scale parameter is determined based on the current actual position and a total length of the actual patrol track.

The current actual position scale parameter is a proportion of the current actual position to the total length of the actual patrol track. For example, the total length of the actual patrol track is 10 meters, and the current actual position of the robot is 1 meter, that is, a distance from the starting point of the actual patrol track to the actual position of the robot is 1 meter, then the current actual position scale parameter is 0.1.

In step S303, the patrol position in the 3D roaming scene is calibrated based on the current actual position scale parameter and the current patrol duration.

In some embodiments, the patrol position in the 3D roaming scene is determined according to the current patrol duration, and is then adjusted using the current actual position scale parameter, so that the patrol position in the 3D roaming scene is made consistent with the actual position of the robot in the real scene.

If the current actual position scale parameter is 0.1 and a position scale parameter determined in the 3D roaming scene is 0.09, it is indicated that the patrol speed in the 3D roaming scene is less than the moving speed of the robot in the real scene, so that the patrol speed in the 3D roaming scene needs to be adjusted to be consistent with the moving speed of the robot in the real scene, so as to allow the patrol position in the 3D roaming scene to be consistent with the position of the robot, thereby improving patrol experience.

In order to improve consistency of the patrol position in the 3D roaming scene and the actual position of the robot in the real scene, calibration of the patrol position in the 3D roaming scene may be carried out in a plurality of patrol periods. With multiple times of the calibration of the position in the plurality of patrol periods, it can be ensured that the patrol position in the 3D roaming scene is synchronized with the patrol of the robot.

In some embodiments, the video patrol method further includes acquiring alarm information, and sending the alarm information to a client to allow the client to send out an alarm to remind a patroller. The client is a mobile terminal or a fixed terminal used by the patroller. The mobile terminal includes, but is not limited to, a mobile phone or an IPAD. The fixed terminal includes, but is not limited to, a computer.

The alarm information is information determined based on a signal collected by a sensor disposed in the patrolled area, and the sensor is a device configured to monitor an environment of the patrolled area or states of the electronic and electrical appliances.

For example, in the case where a temperature sensor is disposed in the patrolled area, when it is determined that a temperature of the patrolled area is higher than a preset temperature based on a temperature signal acquired by the temperature sensor, the alarm information is sent. In the case where a humidity senser is disposed in the patrolled area, when it is determined that humidity of the patrolled area is higher than preset humidity based on a humidity signal acquired by the humidity senser, the alarm information is sent. For example, in a case where a current sensor is disposed in the patrolled area for monitoring current values of the electronic and electrical appliances, when it is determined that a current flowing through an electronic and electrical appliance exceeds a preset current value based on a current value acquired by the current sensor, the alarm information is sent.

In some embodiments, the client reminds the patroller by an acoustic signal and/or an optical signal to enable the patroller to timely deal with failures, so that failure handling efficiency can be increased to avoid unnecessary loss.

It should be noted that the different embodiments in the present disclosure can be combined with each other under the condition that no logic is defied, the descriptions of the different embodiments focus on different contents, and the content which is not focused on in the description of one embodiment may be found in the descriptions of the other embodiments.

According to the video patrol method provided by the embodiments of the present disclosure, the video patrol information acquired from the real scene is matched and combined with the 3D roaming scene to obtain the 3D patrol video simulating the real environment, and the operation and maintenance personnel can acquire the operating states of the patrolled objects from the 3D patrol video with no need to be present on site, so that the labor intensity of the operation and maintenance personnel can be reduced; moreover, compared with the on-site patrol, the patrol through the 3D patrol video can allow the operation and maintenance personnel to monitor more patrolled objects, so that the patrol efficiency can be increased. In addition, the patrol track in the 3D roaming scene is made consistent with the patrol track of the robot through the position calibration, so that the patrol experience can be improved.

In the second aspect, the present disclosure further provides a video patrol device, which simulates a real scene of a patrolled area (such as a machine room) using a 3D roaming technology to realize automatic patrol of the patrolled area.

Figure 4:
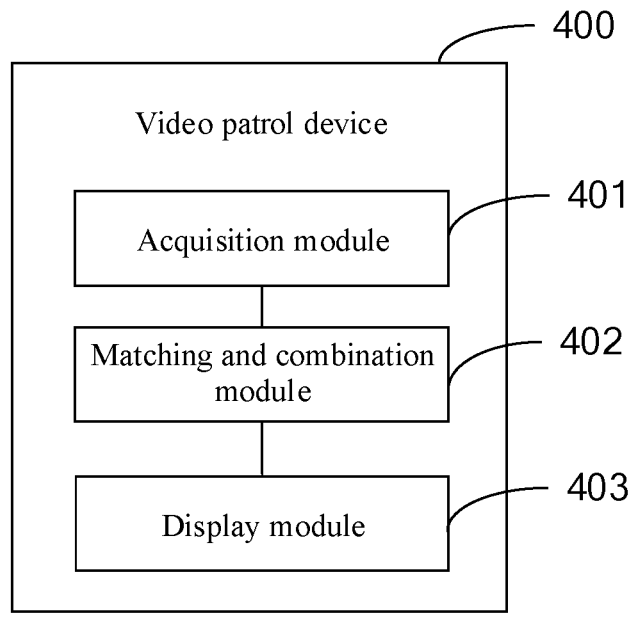
FIG. 4 is a block diagram illustrating a principle of a video patrol device according to an embodiment of the present disclosure.

FIG. 4 is a block diagram illustrating a principle of a video patrol device according to an embodiment of the present disclosure. As shown in FIG. 4, a video patrol device 400 includes:

an acquisition module 401 configured to acquire video patrol information.

The video patrol information is video information acquired from a real scene in a patrolled area, and the real scene is a real scene in the patrolled area. For example, the patrolled area is a machine room, and the video patrol information is video information acquired from the machine room.

In some embodiments, the video patrol information is a video obtained by a camera or another device having a shooting function. For example, the video patrol information is a video obtained by using the camera to shoot each electronic and electrical appliance in the machine room.

The video patrol device 400 includes a matching and combination module 402 configured to match and combine the video patrol information with a 3D roaming scene to obtain a 3D patrol video.

The 3D roaming scene is a virtual scene obtained by simulating the real scene. A 3D model of the patrolled area is constructed using a 3D technology. In the case where the patrolled area is the machine room, a 3D virtual scene with the same scale as the machine room is constructed according to an actual length x, an actual width y, and an actual height z of the machine room, and virtual devices are added at corresponding positions in the 3D virtual scene according to the electronic and electrical appliances disposed in the machine room, thus obtaining the 3D roaming scene. The electronic and electric appliances are patrolled objects, and operating states of the patrolled objects are main objectives of patrol.

In some embodiments, the video patrol information is matched and combined with the 3D roaming scene, so as to make the video patrol information acquired from the real scene be consistent with the positions in the 3D roaming scene, thereby synchronizing the shooting of the camera with the 3D roaming.

The video patrol device 400 includes a display module 403 configured to display the 3D patrol video.

In some embodiments, the display module 403 may be a VR device such as VR glasses or a VR helmet. Or, the display module 403 is a display screen which is watched with 3D glasses. The display module 403 is capable of clearly presenting the states of the patrolled objects in the patrolled area.

With the video patrol device according to the embodiments of the present disclosure, the acquisition module 401 is used to acquire the video patrol information, the matching and combination module is used to match and combine the video patrol information acquired from the real scene with the 3D roaming scene to obtain the 3D patrol video simulating a real environment, and the operation and maintenance personnel can acquire the operating states of the patrolled objects from the 3D patrol video displayed by the display module with no need to be present on site, so that labor intensity of the operation and maintenance personnel can be reduced; moreover, compared with on-site patrol, the patrol through the 3D patrol video can allow the operation and maintenance personnel to monitor more patrolled objects, so that patrol efficiency can be increased.

Figure 5:
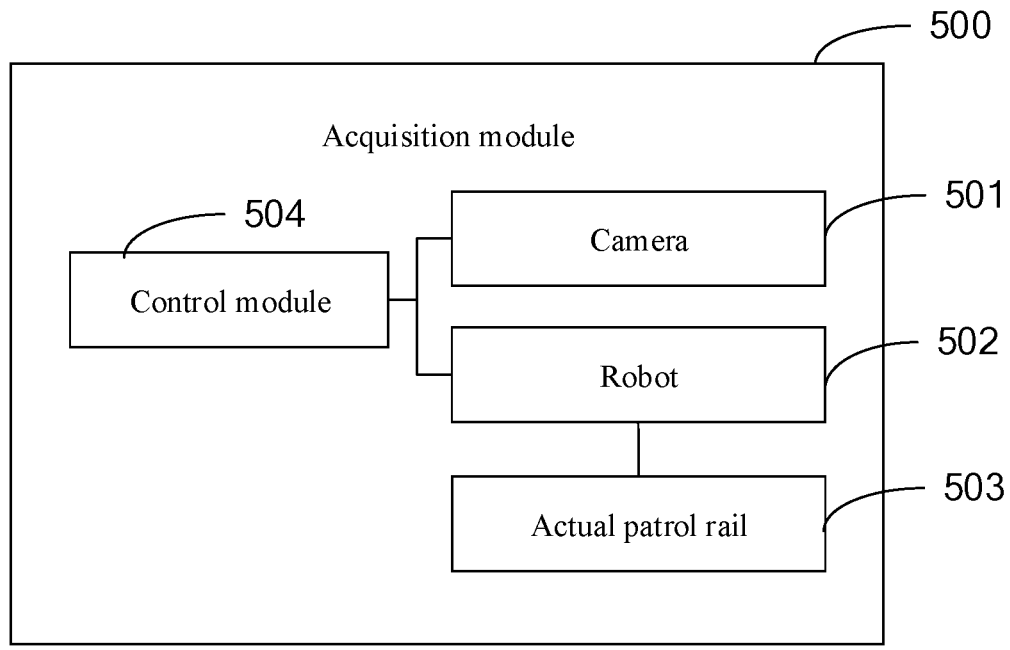
FIG. 5 is a block diagram illustrating a principle of an acquisition module according to an embodiment of the present disclosure.

FIG. 5 is a block diagram illustrating a principle of the acquisition module according to an embodiment of the present disclosure. As shown in FIG. 5, the acquisition module 500 includes: a camera 501, a robot 502, an actual patrol rail 503, and a control module 504.

The actual patrol rail 503 is disposed in the real scene in the patrolled area, and is configured to provide a running track of the robot. The robot 502 is configured to carry the camera 501 to move along the actual patrol rail 503; and the camera 501 is arranged on the robot 502 which carries the camera 501 to move in the real scene to acquire the video patrol information. The control module 504 is in signal connection to the robot 502 and the camera 501, and is configured to control an operating state of the robot 502, a shooting position of the camera 501, and an angle of the camera 501.

In some embodiments, the actual patrol rail 503 may be a track or a path line. When the actual patrol guide 503 is the track, the robot 502 is provided with a component fitting the track. When the actual patrol guide 503 is the path line, the robot 502 is provided with a device for identifying the path line.

Figure 6:
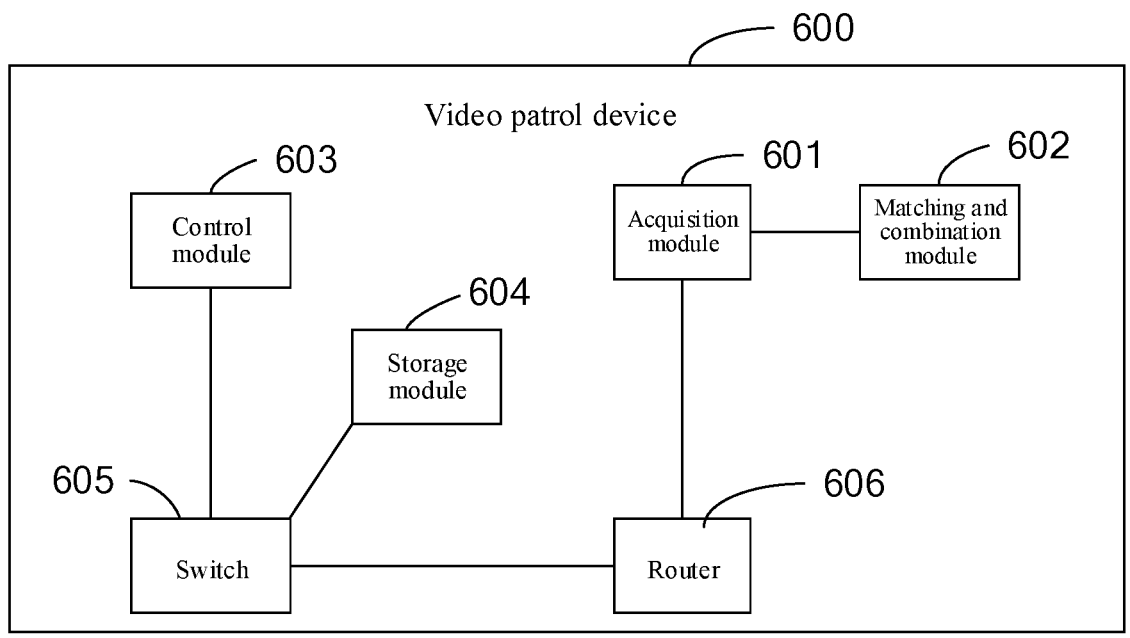
FIG. 6 is a block diagram illustrating a principle of a video patrol device according to an embodiment of the present disclosure.

FIG. 6 is a block diagram illustrating a principle of a video patrol device according to an embodiment of the present disclosure. As shown in FIG. 6, a video patrol device 600 includes an acquisition module 601, a matching and combination module 602, a control module 603, and a storage module 604, and the acquisition module 601 and the matching and combination module 602 are the same as the acquisition module 401 and the matching and combination module 402 described above, and thus will not be repeated herein.

The storage module 604 is configured to store the video patrol information acquired by the camera. When the matching and combination module 602 needs the video patrol information, the matching and combination module 602 may acquire the video patrol information from the storage module 604.

It should be noted that the matching and combination module 602 is capable of acquiring the video patrol information in a flexible way with the aid of the storage module 604. For example, the matching and combination module may acquire the video patrol information corresponding to a current moment, and may also acquire the video patrol information corresponding to any previous moment.

In some embodiments, the control module includes a calibration unit (not shown), which acquires a current actual position of the robot on an actual patrol track and corresponding current patrol duration, determines a current actual position scale parameter based on the current actual position and a total length of the actual patrol track, and calibrates a patrol position in the 3D roaming scene based on the current actual position scale parameter and the current patrol duration.

The current actual position refers to a position of the robot with a starting point of the actual patrol track as a benchmark. The current patrol duration refers to the time taken by the robot from the starting point of the actual patrol track to the current actual position.

The current actual position scale parameter is a proportion of the current actual position to the total length of the actual patrol track. For example, the total length of the actual patrol track is 10 meters, and the current actual position of the robot is 1 meter, that is, a distance from the starting point of the actual patrol track to the actual position of the robot is 1 meter, then the current actual position scale parameter is 0.1.

The calibration unit determines the patrol position in the 3D roaming scene according to the current patrol duration, and then adjusts the patrol position in the 3D roaming scene using the current actual position scale parameter, so as to make the patrol position in the 3D roaming scene be consistent with the actual position of the robot in the real scene.

In order to improve consistency of the patrol position in the 3D roaming scene and the actual position of the robot in the real scene, calibration of the patrol position in the 3D roaming scene may be carried out in a plurality of patrol periods. With multiple times of the calibration of the position in the plurality of patrol periods, it can be ensured that the patrol position in the 3D roaming scene is synchronized with the patrol of the robot.

In some embodiments, the storage module 604 includes a digital video recorder capable of being connected to a plurality of cameras through signals, and the digital video recorder includes at least one storage channel for storing the video patrol information acquired by one camera. The matching and combination module may acquire the video patrol information of the corresponding camera through the storage channel.

In some embodiments, the video patrol device 600 further includes: a switch 605 configured to connect the control module 603 to the storage module 604 through signals. When the storage module 505 is the digital video recorder, the control module 603 may be connected to the digital video recorder through signals by the switch 605.

The video patrol device 600 further includes a router 606 configured to connect the robot to the control module 603 through signals, so as to allow the control module 603 to control a movement mode of the robot, such as moving forward, moving backward, moving upward, and moving downward.

In some embodiments, the video patrol device further includes an alarm module (not shown) configured to acquire failure information of the patrolled objects in the machine room and send the failure information to the display module for being displayed.

In some embodiments, a client reminds a patroller by an acoustic signal and/or an optical signal to enable the patroller to timely deal with failures, so that failure handling efficiency can be increased to avoid unnecessary loss.

In some embodiments of the present disclosure, the functions of the device provided by the embodiments of the present disclosure or the modules included by the device provided by the embodiments of the present disclosure may be used to perform the method described in the above method embodiments, and specific implementation processes and technical effects of the functions or the modules may be found in the description of the above method embodiments, and will not be repeated here for the purpose of conciseness.

With the video patrol device provided by the embodiments of the present disclosure, the video patrol information acquired from the real scene is matched and combined with the 3D roaming scene to obtain the 3D patrol video simulating the real environment, and the operation and maintenance personnel can acquire the operating states of the patrolled objects from the 3D patrol video with no need to be present on site, so that the labor intensity of the operation and maintenance personnel can be reduced; moreover, compared with the on-site patrol, the patrol through the 3D patrol video can allow the operation and maintenance personnel to monitor more patrolled objects, so that the patrol efficiency can be increased. In addition, the patrol track in the 3D roaming scene is made consistent with the patrol track of the robot through the position calibration, so that patrol experience can be improved.

According to the embodiments of the present disclosure, the present disclosure further provides an electronic device, a readable storage medium, and a computer program product.

Figure 7:
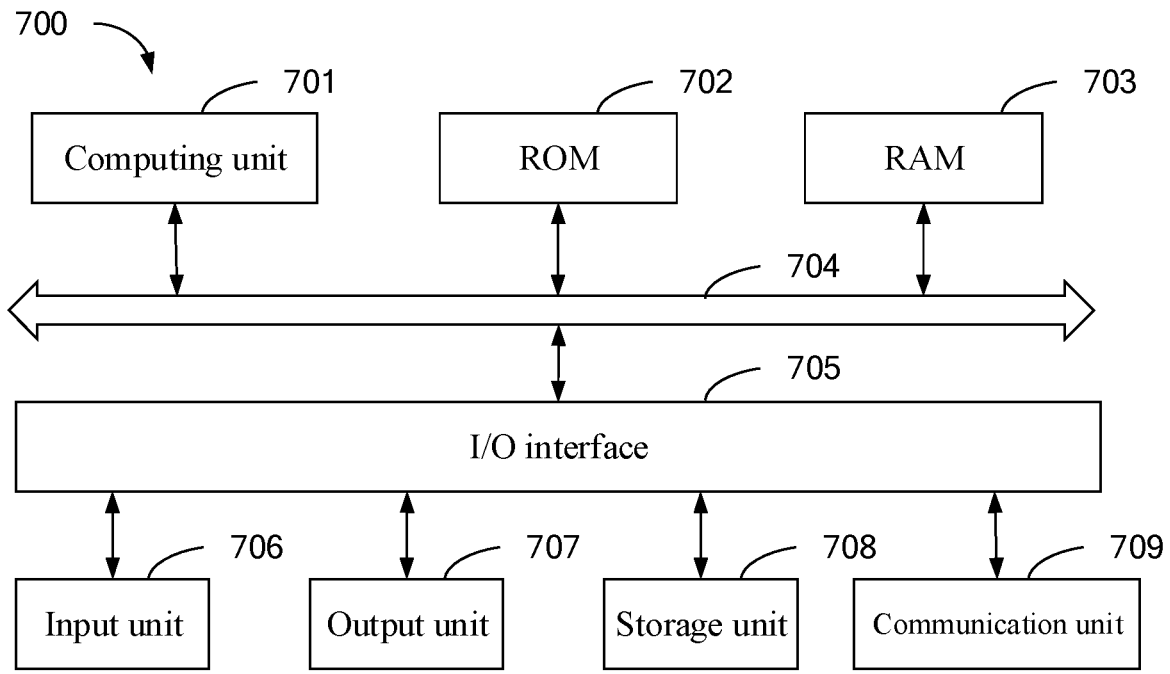
FIG. 7 is a block diagram of an electronic device configured to perform the video patrol method according to the embodiments of the present disclosure.

FIG. 7 is an exemplary block diagram of an exemplary electronic device 700 capable of being used for implementing the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processor, a cellular phone, a smart phone, a wearable device, and other similar computing devices. The components, the connection and the relationships between the components, and the functions of the components, which are described herein, are just for illustration, and are not intended to limit the implementations of the present disclosure described and/or claimed herein.

As shown in FIG. 7, the device 700 includes a computing unit 701 capable of performing various suitable actions and processing according to computer programs stored in a Read-Only Memory (ROM) 702 or computer programs loaded from a storage unit 708 into a Random Access Memory (RAM) 703. Various programs and data required for the operation of the device 700 may be stored in the RAM 703. The computing unit 701, the ROM 702, and the RAM 703 are connected to each other through a bus 704. An input/output (I/O) interface 705 is also connected to the bus 704.

A plurality of components in the device 700 are connected to the I/O interface 705, and include: an input unit 706 such as a keyboard or a mouse; an output unit 707 such as a display of any type or a speaker; the storage unit 708 such as a magnetic disk or an optical disc; and a communication unit 709 such as a network interface controller, a modem, or a wireless communication transceiver. The communication unit 709 allows the device 700 to exchange information/data with other devices via a computer network such as the Internet and/or via various telecommunication networks.

The computing unit 701 may be any general purpose processing component and/or any special purpose processing component with processing and computing capabilities. Some examples of the computing unit 701 include, but are not limited to, a Central Processing Unit (CPU), a Graphics Processing Unit (GPU), various dedicated Artificial Intelligence (AI) computing chips, various computing units running machine learning model algorithms, a Digital Signal Processor (DSP), and any suitable processor, controller and microcontroller. The computing unit 701 performs the above-described method and processing, such as the video patrol method. For example, in some embodiments, the video patrol method may be implemented as a computer software program tangibly included in a machine-readable medium such as the storage unit 708. In some embodiments, part of the computer program or the whole computer program may be loaded and/or installed into the device 700 through the ROM 702 and/or the communication unit 709. When the computer program is loaded into the RAM 703 and executed by the computing unit 701, one or more steps of the video patrol method described above may be performed. Alternatively, in other embodiments, the computing unit 701 may be configured by any other suitable means (such as with the aid of firmware) to perform the video patrol method.

Various implementations of the systems and techniques described above may be implemented in a digital electronic circuit system, an integrated circuit system, a Field Programmable Gate Array (FPGA), an Application Specific Integrated Circuit (ASIC), an Application Specific Standard Product (ASSP), a system on a chip (SOC), a Complex Programmable Logic Device (CPLD), computer hardware, firmware, software, and/or combinations thereof. The various implementations may include: implementing in one or more computer programs that are executable and/or interpretable on a programmable system including at least one programmable processor, which may be a special purpose programmable processor or a general purpose programmable processor, and is capable of receiving data and instructions from a storage system, at least one input device, and at least one output device and transmitting data and instructions to the storage system, the at least one input device, and the at least one output device.

The program code for implementing the method of the present disclosure may be written in one programming language or using any combination of more than one programming languages. The program code may be provided for a processor or a controller of a general purpose computer, a special purpose computer or another programmable data processing device, so as to allow the functions/operations specified in the flowcharts and/or the block diagrams to be performed when the program code is executed by the processor or the controller. The program code may be executed entirely or partially on a machine, or may be executed partially on the machine as an independent software packet and partially on a remote machine, or may be executed entirely on the remote machine or a server.

In the present disclosure, the machine-readable medium may be a tangible medium which may contain or store programs for being used by or together with an instruction execution system, device or apparatus. The machine-readable medium may be a machine-readable signal medium or a machine-readable storage medium. The machine-readable medium may include, but is not limited to, an electronic system, device or apparatus, a magnetic system, device or apparatus, an optical system, device or apparatus, an electromagnetic system, device or apparatus, an infrared system, device or apparatus, a semiconductor system, device or apparatus, or any suitable combination thereof. Specific examples of the machine-readable storage medium include an electrical connection based on one or more wires, a portable computer disk, a hard disk, an RAM, an ROM, an Erasable Programmable Read-Only Memory (EPROM) or a flash memory, an optical fiber, a portable Compact Disc Read Only Memory (CD-ROM), an optical storage device, a magnetic storage device, or any suitable combination thereof.

In order to provide interaction with a user, the systems and techniques described herein may be implemented on a computer, including: a display device (e.g., a Cathode Ray Tube (CRT) or a Liquid Crystal Display (LCD) monitor) configured to display information for the user; and a keyboard and a pointing device (e.g., a mouse or a trackball), through which the user may provide an input for the computer. Other types of devices may also be used to provide the interaction with the user; for example, feedback provided for the user may be any form of sensory feedback (e.g., visual feedback, auditory feedback, or tactile feedback); and the input from the user may be received in any form (including an acoustic input, a speech input, or a tactile input).

The systems and techniques described herein may be implemented in a computing system (for example, as a data server) including a backend component, or a computing system (e.g., an application server) including a middleware component, or a computing system (e.g., a user computer having a graphical user interface or a web browser, through which the user may interact with the implementations of the systems and techniques described herein) including a front-end component, or a computing system including any combination of the backend component, the middleware component and the front-end component. The components of the system may be interconnected through digital data communication (e.g., a communication network) of any form or through digital data communication (e.g., the communication network) using any medium. Examples of the communication network include: a Local Area Network (LAN), a Wide Area Network (WAN), and the Internet.

A computer system may include a client and a server. The client and the server are generally remote from each other and typically interact with each other through the communication network. A relationship between the client and the server is generated by running computer programs, which have a client-server relationship, on respective computers.

An embodiment of the present disclosure further provides a computer program product, including a computer program. When the computer program is executed by a processor, the above video patrol method is carried out.

It should be understood that various forms of the above processes may be used to reorder, add or delete steps. For example, all the steps described in the present disclosure may be performed concurrently, or performed sequentially, or performed in an order different from that described herein as long as the desired results of the technical solutions of the present disclosure can be produced, and the order of performing the steps is not limited herein.

The above specific implementations do not constitute any limitation to the scope of the present disclosure. It should be understood by those skilled in the art that various modifications, combinations, sub-combinations and substitutions may be made according to design requirements and other factors. Any modification, equivalent replacement, and improvement made within the spirit and principle of the present disclosure should be included in the scope of the present disclosure.

What is claimed is:

1. A video patrol method, comprising:
    acquiring video patrol information, wherein the video patrol information is video information acquired from a real scene;
    matching and combining the video patrol information with a 3D roaming scene to obtain a 3D patrol video, wherein the 3D roaming scene is a virtual scene obtained by simulating the real scene; and
    displaying the 3D patrol video,
    wherein acquiring the video patrol information comprises:
    acquiring the video patrol information by a camera moving in the real scene, the camera being arranged on a robot which moves along an actual patrol track,
    before matching and combining the video patrol information with the 3D roaming scene to obtain the 3D patrol video, further comprising:
    obtaining the 3D roaming scene based on the real scene;
    simulating a 3D roaming patrol track in the 3D roaming scene according to an actual patrol rail; and
    calibrating a virtual position in the 3D roaming scene based on a current actual position of the robot and current patrol duration of the robot, wherein the current patrol duration is time consumed by the robot to reach the current actual position from an initial position of the actual patrol track,
    wherein calibrating a patrol position in the 3D roaming scene based on the current actual position of the robot and the current patrol duration of the robot in the real scene comprises:
    acquiring the current actual position of the robot on the actual patrol track and the corresponding current patrol duration of the robot;
    determining a current actual position scale parameter based on the current actual position and a total length of the actual patrol track; and
    calibrating the patrol position in the 3D roaming scene based on the current actual position scale parameter and the current patrol duration.

2. The method of claim 1, wherein a patrol position in the 3D roaming scene is determined according to total patrol duration of the robot on the actual patrol track and the current patrol duration.

3. The method of claim 1, wherein acquiring the current actual position of the robot on the actual patrol track and the corresponding current patrol duration of the robot comprises:
    acquiring the current actual position of the robot on the actual patrol track and the corresponding current patrol duration of the robot at a fixed frequency in a patrol period.

4. The method of claim 1, wherein the 3D roaming scene is obtained by simulating the real scene in equal proportion.

5. The method of claim 1, further comprising:
    acquiring alarm information, and sending the alarm information to a client to allow the client to send an alarm prompt.

6. A video patrol device, comprising:
    an acquisition module configured to acquire video patrol information, wherein the video patrol information is video information acquired from a real scene in a patrolled area;
    a matching and combination module configured to match and combine the video patrol information with a 3D roaming scene to obtain a 3D patrol video, wherein the 3D roaming scene is a virtual scene obtained by simulating the real scene; and
    a display module configured to display the 3D patrol video,
    wherein the acquisition module comprises: a camera, a robot and an actual patrol rail,
    wherein the actual patrol rail is disposed in the real scene in the patrolled area, and is configured to provide a running track of the robot;
    the robot moves along the actual patrol rail;
    the camera is arranged on the robot which carries the camera to move in the real scene to acquire the video patrol information, before matching and combining the video patrol information with the 3D roaming scene to obtain the 3D patrol video, further comprising:

obtaining the 3D roaming scene based on the real scene;

simulating a 3D roaming patrol track in the 3D roaming scene according to an actual patrol rail; and calibrating a virtual position in the 3D roaming scene based on a current actual position of the robot and current patrol duration of the robot, wherein the current patrol duration is time consumed by the robot to reach the current actual position from an initial position of the actual patrol track, wherein calibrating a patrol position in the 3D roaming scene based on the current actual position of the robot and the current patrol duration of the robot in the real scene comprises:

acquiring the current actual position of the robot on the actual patrol track and the corresponding current patrol duration of the robot;

determining a current actual position scale parameter based on the current actual position and a total length of the actual patrol track; and calibrating the patrol position in the 3D roaming scene based on the current actual position scale parameter and the current patrol duration.

7. The device of claim 6, wherein the acquisition module further comprises a control module, wherein the control module is in signal connection to the robot and the camera, and is configured to control an operating state of the robot, a shooting position of the camera, and an angle of the camera.

8. The device of claim 7, further comprising a storage module configured to store the video patrol information acquired by the camera, wherein the storage module comprises a digital video recorder, the digital video recorder comprises at least one storage channel, and each storage channel is configured to store the video patrol information acquired by one camera.

9. The device of claim 8, further comprising:

a switch configured to connect the control module to the digital video recorder through signals; and a router configured to connect the robot to the control module through signals.

10. The device of claim 6, further comprising:

an alarm module configured to acquire failure information of patrolled objects in a machine room, and send the failure information to the display module for being displayed.

11. An electronic device, comprising:

at least one processor; and a memory in communication with the at least one processor; wherein the memory stores an instruction executable by the at least one processor, and the instruction, when executed by the at least one processor, causes the at least one processor to carry out the method of claim 1.

12. A non-transitory computer-readable storage medium storing a computer instruction, wherein the computer instruction is configured to cause a computer to carry out the method of claim 1.

* * * * *